United States Patent [19]

Swenor et al.

[11] Patent Number: 5,518,388

[45] Date of Patent: May 21, 1996

[54] AUTOMATED APPARATUS AND METHOD FOR RESIN TRANSFER MOLDING

[75] Inventors: Richard D. Swenor, Enfield; Peter Hryniewicz, Suffield, both of Conn.; Thomas W. Allen, Blandford; Leo E. Carmody, Southwick, both of Mass.

[73] Assignee: United Technologies Corporation, Hartford, Conn.

[21] Appl. No.: 166,724

[22] Filed: Dec. 14, 1993

[51] Int. Cl.⁶ .................................................. B29C 45/76
[52] U.S. Cl. ........................ 425/144; 425/145; 425/149
[58] Field of Search ................................. 425/143, 144, 425/145, 149, 129.1, 544

[56] References Cited

U.S. PATENT DOCUMENTS

| 3,840,312 | 10/1974 | Paulson et al. | 425/145 |
| 4,386,898 | 6/1983 | Sera | 425/145 |

FOREIGN PATENT DOCUMENTS

| 2603891 | 8/1976 | Germany | 425/145 |
| 51-563 | 1/1976 | Japan | 425/145 |
| 62-178318 | 8/1987 | Japan | 425/145 |
| 63-114618 | 5/1988 | Japan | 425/145 |
| 4-308719 | 10/1992 | Japan | 425/145 |

*Primary Examiner*—James P. Mackey
*Attorney, Agent, or Firm*—McCormick, Paulding & Huber

[57] ABSTRACT

In an automated apparatus and method for resin transfer molding, a resin pot defining a resin chamber for receiving liquid resin is coupled in fluid communication with a mold cavity. A pump unit in the form of a piston member driven by a hydraulic cylinder, is received within the resin chamber, and pumps the resin from the resin chamber into the mold cavity upon stroking the piston member. A control unit is coupled to the pump unit, and to a pressure sensor which transmits signals to the control unit indicative of the pressure of the resin flowing between the resin chamber and the mold cavity. The control unit is responsive to the signals from the pressure sensor to control the pump unit, and maintain the resin flowing between the resin chamber and the mold cavity at a substantially constant pressure. Another sensing unit, in the form of a position sensor, transmits signals to the control unit indicative of movement of the pump unit, and thus indicative of the flow rate of resin between the resin chamber and the mold cavity. The control unit is responsive to the signals transmitted by the position sensor, to terminate the flow of resin into the mold cavity and operation of the pump unit, and thus terminate the resin transfer process, in response to the flow rate of resin decreasing below a predetermined minimum value.

14 Claims, 5 Drawing Sheets

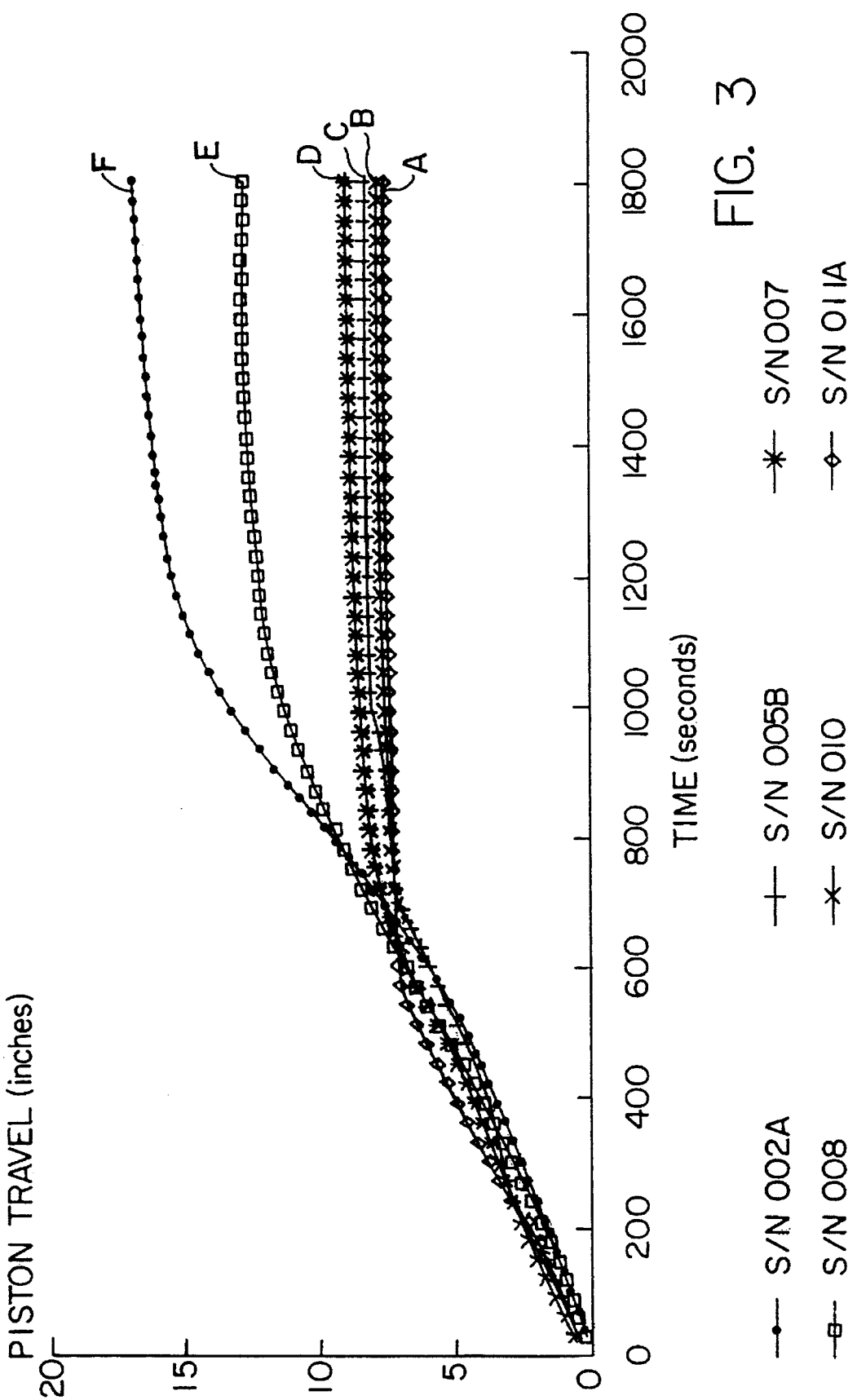

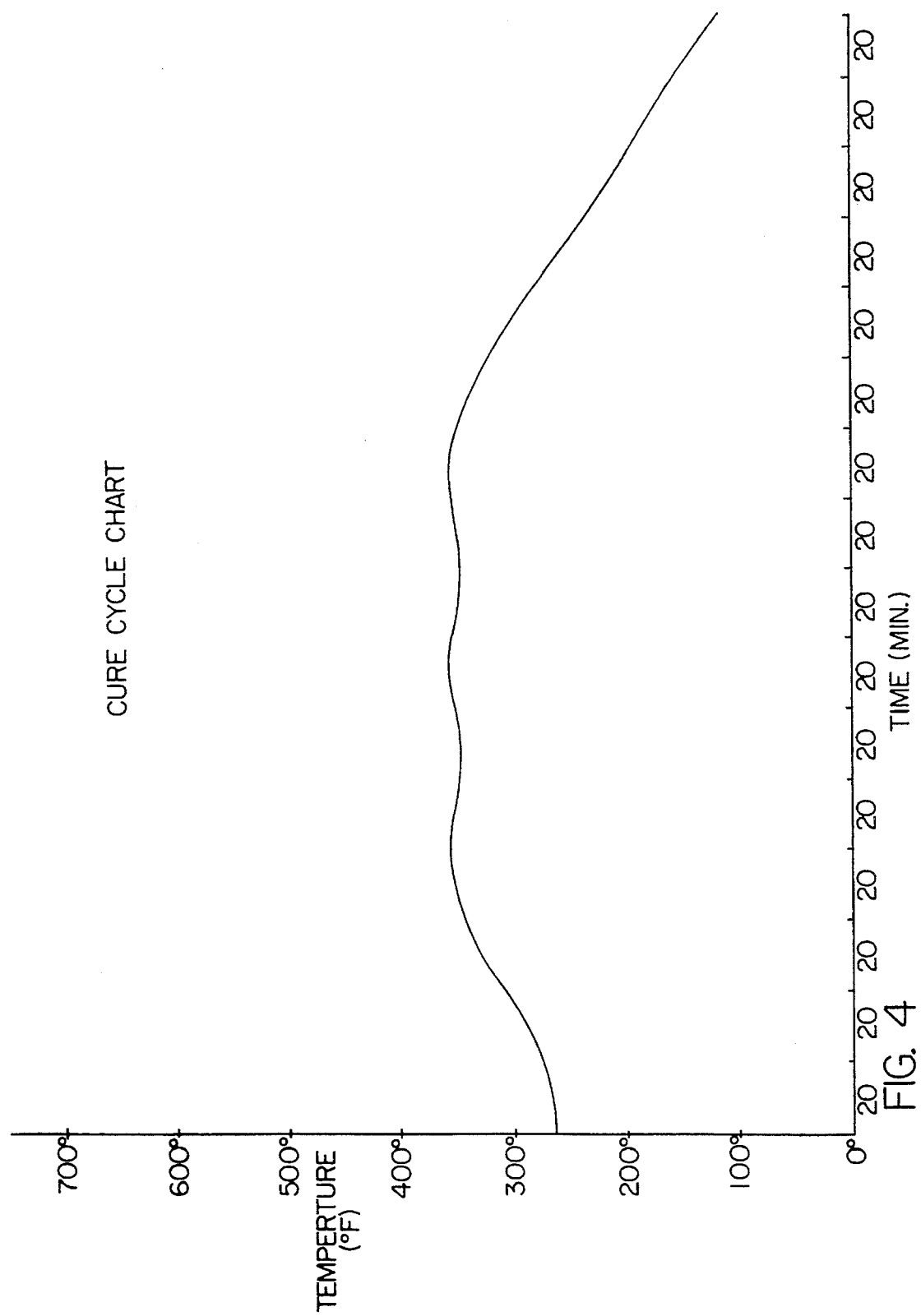

AUTOMATED APPARATUS AND METHOD FOR RESIN TRANSFER MOLDING

FIELD OF THE INVENTION

The present invention relates to apparatus and methods for molding, and more particularly, to automated apparatus and methods for resin transfer molding.

CROSS REFERENCE TO RELATED APPLICATION

The subject matter of the present specification is related to the subject matter of the co-pending patent application, Ser. No. 08/168,070, entitled "APPARATUS AND METHOD FOR RESIN TRANSFER MOLDING", filed on Dec. 14, 1993 and assigned to the same assignee as is the present invention, and which is hereby expressly incorporated by reference as part of the present disclosure.

BACKGROUND OF THE INVENTION

In a typical resin transfer molding process, a fiber preform of the article to be molded is placed within a mold cavity, and a liquid resin is introduced into the mold cavity. The resin is absorbed by the fiber preform, and then thermally cured to form the article of manufacture. Typical fibers used to make fiber preforms include fiberglass, graphite, carbon and Kevlar, and the fibers are often braided or woven into a sheet form. The resins are typically epoxy resins, although other types of resins, such as polyester resins, are also employed.

In a typical prior art system for resin transfer molding, the liquid resin is introduced into a heated pressure pot, which is coupled in fluid communication by a resin line to the mold cavity of a steel mold. The mold cavity is in turn coupled in fluid communication to a collection pot, which is coupled to a vacuum pump. The resin is typically heated to mold temperature, i.e., catalyzed, in the pressure pot. The fiber or structural preform is placed in the mold cavity, and a negative pressure is created in the mold cavity by the vacuum pump prior to introduction of the liquid resin into the mold cavity. The liquid resin is transferred from the pressure pot to the mold cavity by introducing pressurized gas into the pressure pot, which in turn causes the pressurized resin to flow into the mold cavity. As the pressurized, heated resin is introduced into the mold cavity, it is absorbed by the fiber preform.

At selected time intervals after introduction of the heated resin into the mold cavity, an operator opens the line coupled between the collection pot and the mold cavity and bleeds resin from the mold cavity into the collection pot. The collection pot typically includes a sight glass to enable the operator to view the released resin, and determine if there are air bubbles visible in the resin. The operator then determines, based on experience and skill, whether the mold cavity is filled with resin (i.e., whether the fiber preform is saturated with resin). If there are visible air bubbles, the operator closes the line to the collection pot, pressurizes the pressure pot again, and continues to introduce pressurized resin into the mold cavity. This resin bleeding and inspection process is repeated at spaced intervals in time until the operator determines based on experience and skill that the mold cavity is purged of air, and is filled so that the fiber preform is saturated with resin.

Each resin bleeding and inspection step is relatively time consuming, primarily because after the operator bleeds resin into the collection pot, the pressure pot must be pressurized again. This bleeding and inspection step is typically repeated at least three or four times for each article that is molded, making the resin transfer process time consuming and relatively expensive. Resin is also wasted each time the operator is required to bleed the resin into the collection pot to inspect the resin. Because this occurs several times during the molding of each article, the volume of wasted resin and corresponding wasted costs can be substantial.

Another drawback of such prior systems is that they rely on operator judgment to determine when the mold cavity and fiber preform are filled with resin. This typically results in poor repeatability, and lower overall quality of the articles being produced. If the operator prematurely terminates the resin transfer molding process, the molded part will typically have voids caused by an insufficient absorption of resin by the structural preform, which usually renders the part not usable. This is particularly the case in the aerospace industry, wherein voids or other such defects in aircraft components is intolerable.

It is an object of the present invention to overcome the drawbacks and disadvantages of such prior art apparatus and methods for resin transfer molding.

SUMMARY OF THE INVENTION

According to the present invention, an apparatus for molding articles by resin transfer comprises a mold defining a mold cavity for receiving a structural preform to be impregnated with resin. A resin unit defining a resin chamber for receiving resin, is coupled in fluid communication with the mold cavity for introducing resin into the mold cavity. A pump unit is coupled in fluid communication with the resin unit for pumping resin from the resin chamber into the mold cavity. A first sensor unit generates signals indicative of the flow rate of resin between the resin chamber and the mold cavity, and a control unit is responsive to the signals transmitted by the first sensor unit to terminate the flow of resin from the resin chamber into the mold cavity in response to the flow rate of resin decreasing to a value less than a predetermined minimum value.

According to another aspect of the present invention, a second sensor unit generates signals indicative of the pressure of the resin flowing between the resin chamber and the mold cavity. The control unit is also preferably coupled to the second sensor unit, and is responsive to the signals transmitted by the second sensor unit to control operation of the pump unit, and maintain the pressure of resin flowing between the resin chamber and the mold cavity within a predetermined pressure range.

In one embodiment of the present invention, the control unit is responsive to the signals transmitted by the first sensor unit to generate data indicative of the flow rate of resin flowing between the resin chamber and the mold cavity during the resin transfer process.

According to another aspect of the present invention, an apparatus further comprises at least one third sensor unit for measuring at least one parameter of the apparatus and generating signals indicative thereof. The third sensor unit is coupled to the control unit, which is responsive to the signals transmitted by the third sensor unit to compare the signals to corresponding predetermined values thereof, and to adjust the at least one measured parameter to maintain a substantially constant value thereof. In a preferred embodiment of the present invention, the measured parameters include i) the temperature of resin within the resin chamber, ii) the temperature of resin flowing between the resin chamber and the mold cavity, iii) the pressure of resin flowing between the resin chamber and the mold cavity, and iv) the temperature of the mold cavity.

According to another aspect of the present invention, a method for molding articles by resin transfer comprises the following steps: i) pumping resin from a resin chamber into a mold cavity; ii) generating signals indicative of the flow rate of resin flowing between the resin chamber and the mold cavity; and iii) maintaining the pressure of the resin flowing between the resin chamber and the mold cavity within a substantially predetermined pressure range.

According to another aspect of the present invention, a method of the foregoing type further comprises the step of terminating the flow of resin from the resin chamber into the mold cavity in response to the flow rate of resin between the resin chamber and the mold cavity falling below a predetermined minimum rate. A method of the present invention also further comprises the step of generating data indicative of the flow rate of resin flowing between the resin container and the mold cavity during the resin transfer process.

One advantage of the present invention, is that it permits automatic termination of the resin transfer process in response to the flow rate of resin from the resin chamber into the mold cavity decreasing below a predetermined minimum value. Reliance on operator skill and judgment to determine when the structural preform is saturated with resin is therefore eliminated, and reliability and repeatability is significantly enhanced in comparison to prior art apparatus and methods.

Another advantage of the present invention, is that it permits system parameters, including resin flow rate, resin temperature and mold temperature, to be automatically measured and recorded during the resin transfer process for each article being molded, and this information can be used to ensure quality control of the articles being molded.

Other advantages of the present invention will become apparent in view of the following detailed description and accompanying drawings.

BRIEF DESCRIPTION OF THE DRAWINGS

FIG. 3 is a typical resin flow chart generated by the apparatus of FIG. 1 illustrating in graphical format the piston travel vs. time during the resin transfer process for several molded articles; and FIG. 4 is a typical cure cycle chart generated by the apparatus of FIG. 1 illustrating in graphical format the mold temperature vs. time during the cure cycles for several molded articles.

DETAILED DESCRIPTION OF THE PREFERRED EMBODIMENT

Figure 1:
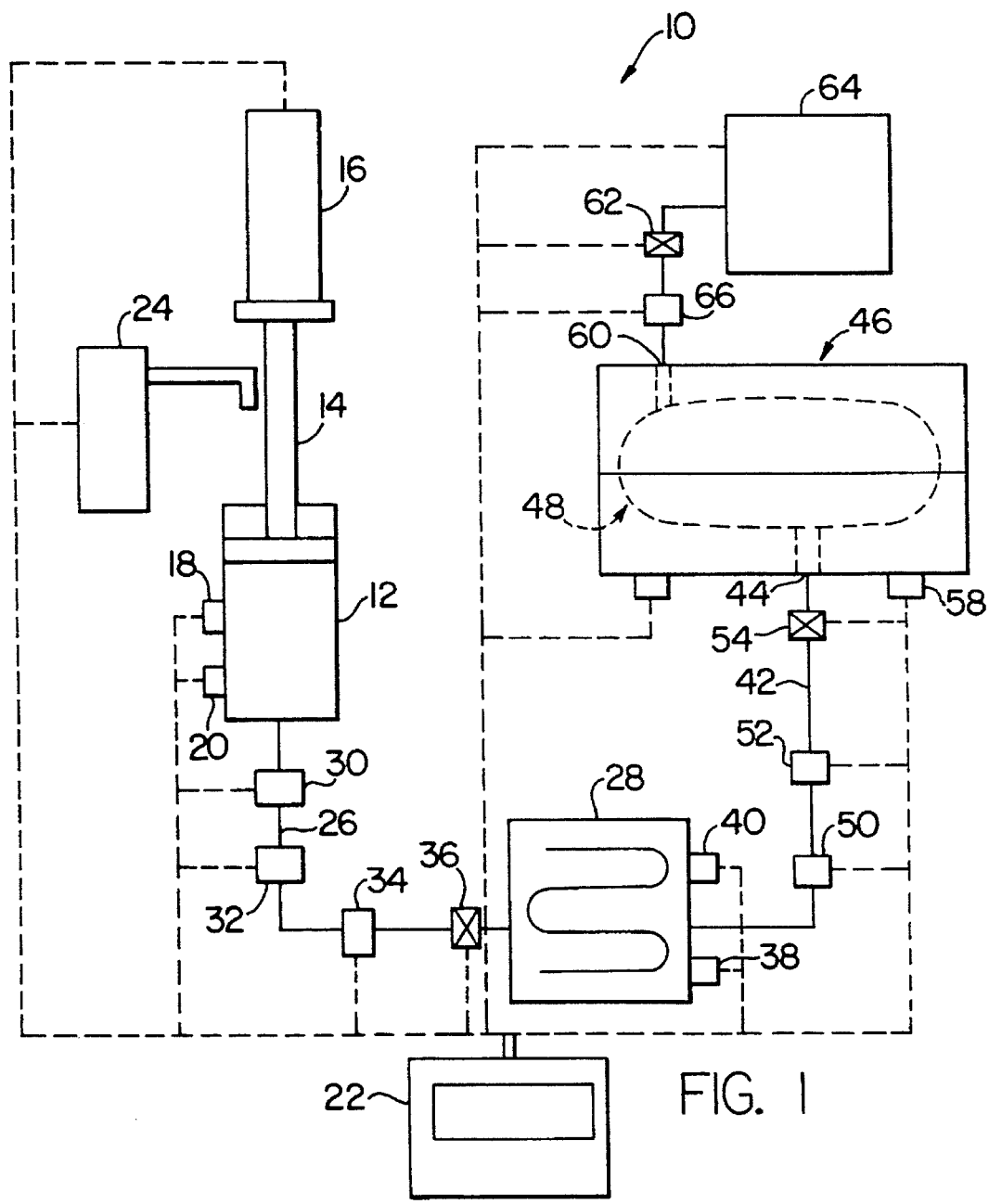
FIG. 1 is a schematic illustration of an automated apparatus embodying the present invention for resin transfer molding.

In FIG. 1, an apparatus embodying the present invention for resin transfer molding is indicated generally by the reference numeral 10. Many of the hardware components of the apparatus 10 are the same as the corresponding components disclosed in the co-pending U.S. patent application, Ser. No. 08/168,070, entitled "APPARATUS AND METHOD FOR RESIN TRANSFER MOLDING", identified above, and which has been incorporated by reference as part of the present disclosure.

The apparatus 10 comprises a resin pot 12 for receiving the liquid resin, and a pump unit in the form of a piston 14 received within a cylindrical bore of the resin pot 12 for pumping the resin through the resin pot. A hydraulic cylinder 16 is coupled to the piston 14 to drive the piston within the resin pot and displace the resin from the pot, as is described further below. The resin pot 12 includes heating elements 18 mounted on the resin pot for heating the resin to a predetermined working temperature above the room temperature, but below the catalyzing temperature of the resin. In the embodiment of the present invention illustrated, the resin working temperature is within the range of approximately 120° to 150° F. The resin working temperature is selected to maintain consistency from one molded article to the next, and preferably to reduce the viscosity of the resin in order to facilitate injection of the resin through the outlet port of the resin pot 12. A plurality of thermocouples, shown typically at 20, are mounted on the resin pot 12 to transmit signals indicative of the temperature of the resin pot.

A control unit 22 including a visual display is coupled to the thermocouples 20 and to the heating elements 18, and is responsive to the signals transmitted by the thermocouples 20 to control actuation of the heating elements 18 and maintain the resin within the resin pot 12 at a substantially constant predetermined working temperature. The control unit 22 is also coupled to the hydraulic cylinder 16 to control actuation of the hydraulic cylinder, and movement of the piston 14. The control unit 22 is also programmed to control the hydraulic pressure of the hydraulic cylinder 16, and in turn control the pressure of the resin flowing from the resin pot 12, as is described further below.

A position sensor 24 is mounted adjacent to the piston 14 to measure the movement of the piston. In the embodiment of the present invention illustrated, the position sensor 24 is a Sony "Magnascale", model no. NA31-F. It is noted, however, that any of numerous other position sensors known to those skilled in the pertinent art may equally be employed in the apparatus of the present invention. The position sensor 24 monitors the movement of the piston 14 and transmits signals indicative thereof to the control unit 22. The control unit 22 is responsive to the signals transmitted by the position sensor 24 to record the movement of the piston relative to time during each resin transfer process for quality control purposes, and to terminate the resin transfer process, as is described further below. Because the internal volume of the resin pot 12 is a known value, the signals transmitted by the position sensor 24 are indicative of resin flow rate, and can be directly converted to flow rate values.

An outlet port of the resin pot 12 is coupled through a first heated resin line 26 to a preheater 28. The heated resin line 26 includes heating elements, shown typically at 30, for heating the resin flowing through the first resin line to a predetermined temperature. One or more thermocouples, shown typically at 32, are mounted on the first resin line 26, and transmit signals to the control unit 22 indicative of the temperature of the resin flowing through the first resin line. The control unit 22 is coupled to the heating elements 30, and is responsive to the signals transmitted by thermocouples 32 to control actuation of the heating elements and to maintain the resin flowing through the first resin line at a substantially constant temperature. In the embodiment of the present invention illustrated, the resin flowing through the first resin line 26 is maintained at a temperature of approximately 250° F. It is noted, however, that this temperature is only exemplary, and that it may be varied depending upon the requirements of a particular system.

A pressure sensor 34 is mounted within the first resin line 26, and transmits signals to the control unit 22 indicative of the pressure of the resin within the first resin line. The control unit 22 is responsive to the signals transmitted by the pressure sensor 34 to control the hydraulic pressure of the hydraulic cylinder 16, and thus the force applied to the piston 14, in order to maintain the resin within the first resin line at a substantially constant predetermined pressure or within a predetermined pressure range. In the embodiment of the present invention illustrated, this pressure is approximately 50 psi. This number is purely exemplary, however, and may be varied depending upon the safety requirements of a particular system, and the article to be molded. The greater the resin pressure, typically the faster is the rate at which the resin is absorbed by the structural preform. However, if the resin pressure is too great, it may damage the structural preform, and thereby destroy the article being molded.

An inlet valve 36 is coupled between the first resin line 26 and the preheater 28 to control the flow of resin into the preheater. The inlet valve 36 is coupled to the control unit 22 to control actuation of the valve. In the embodiment of the present invention illustrated, the inlet valve 36 is a pneumatic clamp-type valve, although numerous other types of valves for controlling the resin flow through the resin line may equally be employed.

The preheater 28 includes heating elements 38 for heating the resin as it is passed through the coils of the preheater, illustrated schematically in FIG. 1, and one or more thermocouples, shown typically at 40, are mounted on the preheater for transmitting signals to the control unit 22 indicative of the temperature of the resin passing through the preheater. The control unit 22 is also coupled to the heating elements 38, and is responsive to the signals transmitted by the thermocouples 40 to control actuation of the heating elements, and maintain the resin passing through the preheater at a substantially constant predetermined temperature or within a predetermined temperature range. In the embodiment of the present invention illustrated, this temperature is preferably within the range of approximately 300° to 320° F. It is noted that this temperature range is only exemplary, however, and may be varied depending upon the requirements of a particular system.

A second heated resin line 42 is coupled between the preheater 28 and an inlet port 44 of a mold 46. The inlet port 44 is coupled in fluid communication with a mold cavity 48, as illustrated in dashed lines in FIG. 1. The second resin line 42 includes heating elements, shown typically at 50, and thermocouples, shown typically at 52, for transmitting signals to the control unit 22 indicative of the temperature of the resin flowing through the second resin line. The control unit 22 is also coupled to the heating elements 50, and is responsive to the signals transmitted by the thermocouples 52 to control actuation of the heating elements, and maintain the resin flowing through the second resin line at a substantially constant predetermined temperature or within a predetermined temperature range. In the embodiment of the present invention illustrated, this temperature is preferably approximately the same as the temperature of the preheater 28, although it may be varied depending upon the requirements of a particular system.

An inlet valve 54 is coupled between the second heated resin line 42 and the inlet port 44 of the mold 46, and is coupled to the control unit 22 to control the flow of resin from the resin line into the mold cavity 48. In the embodiment of the present invention illustrated, the valve 54 is a pneumatic clamp-type valve, although it is noted that numerous other types of valves for controlling the flow of resin through the resin line may equally be employed.

The mold 46 includes heating elements, shown typically at 56, and thermocouples, shown typically at 58, for transmitting signals to the control unit 22 indicative of the temperature of the mold cavity 48. The control unit 22 is coupled to the heating elements 56, and is responsive to the signals transmitted by the thermocouples 58 to control actuation of the heating elements and maintain the walls defining the mold cavity 48 at a substantially constant predetermined temperature or within a predetermined temperature range. In the embodiment of the present invention illustrated, the temperature of the mold cavity is preferably approximately the same as the preheater 28 and second resin line 42.

The mold 46 defines a vacuum port 60 coupled in fluid communication with the mold cavity 48, which is in turn coupled through a valve 62 to a vacuum pump 64. A pressure sensor 66 is mounted within the vacuum line extending between the vacuum port 60 and the vacuum pump 64, and transmits signals to the control unit 22 indicative of the pressure within vacuum line and mold cavity. The control unit 22 is responsive to the signals transmitted by the pressure sensor 66 to control operation of the vacuum pump 64, in order to create a predetermined negative pressure within the mold cavity 48 prior to introduction of the resin into the mold cavity. The vacuum valve 62 is also coupled to the control unit 22, which controls operation of the valve in order to connect or disconnect the vacuum pump to the mold cavity. The vacuum valve 62 is preferably a pneumatic clamp-type valve, although it is noted that numerous other types of valves may equally be employed.

Figure 2A:
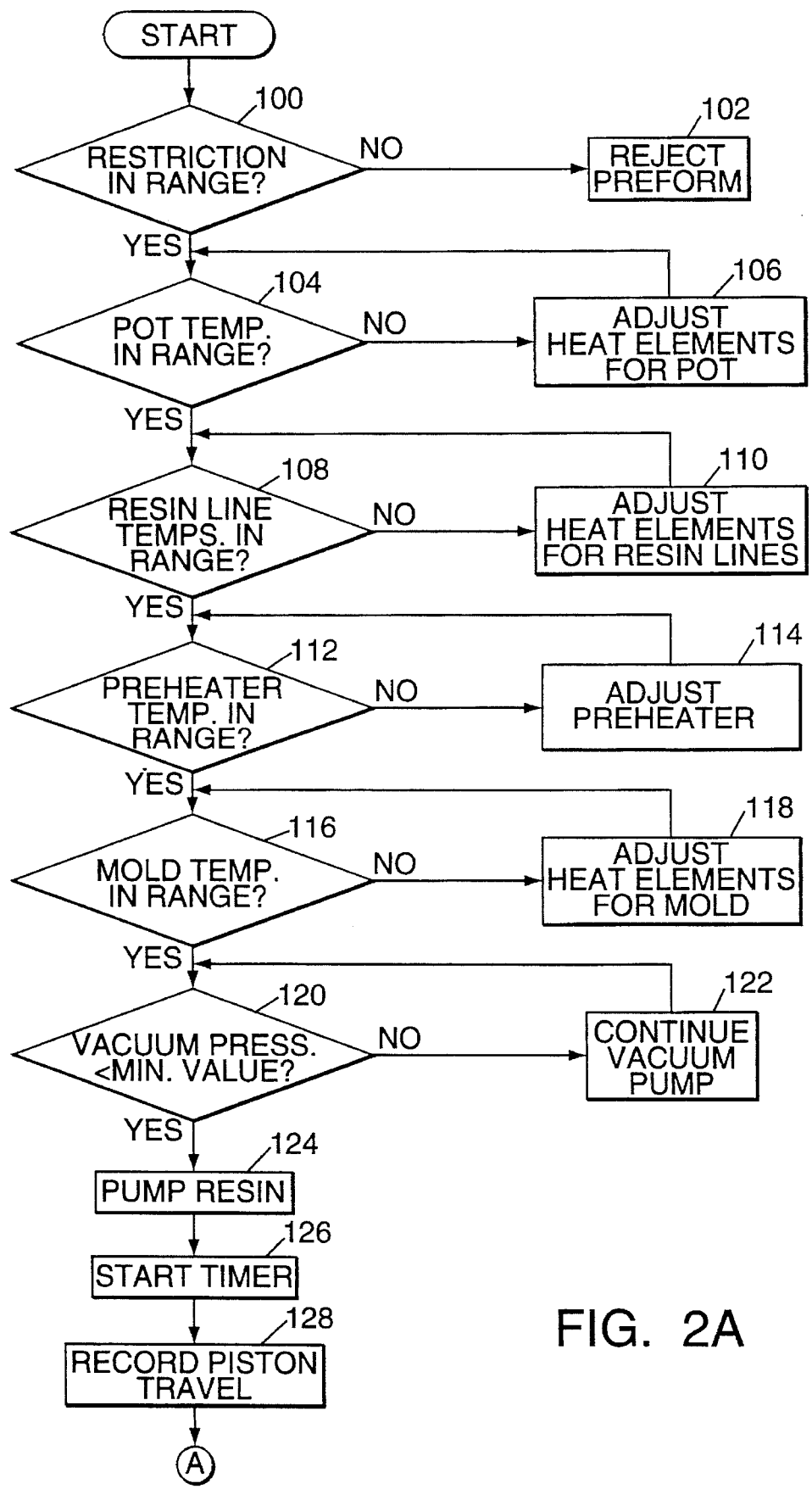
FIGS. 2A and 2B are a flow chart illustrated conceptually the procedural steps of operating a resin transfer molding apparatus in accordance with a method of the present invention.
Figure 2B:
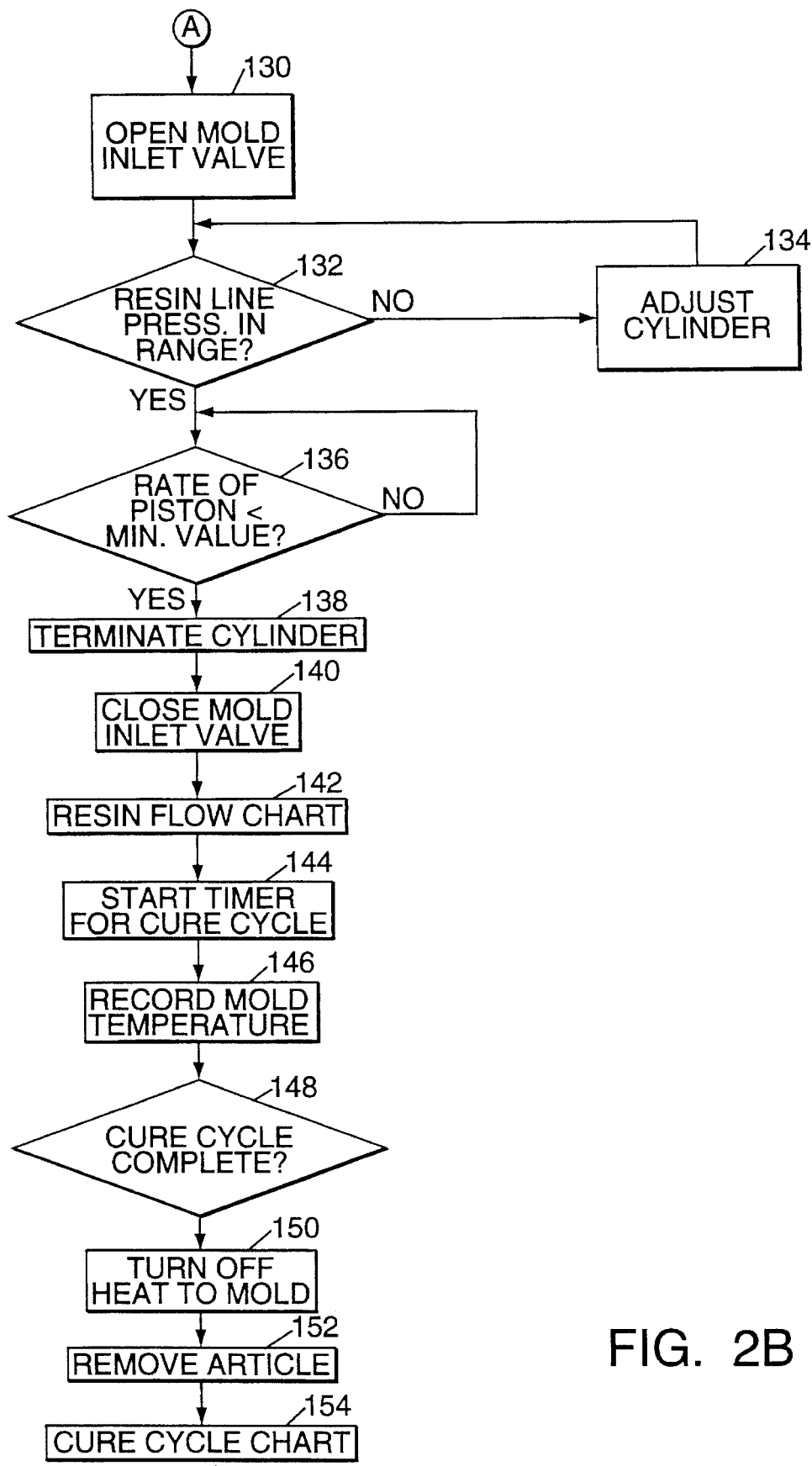

Turning to FIGS. 2A and 2B, a flow chart illustrates conceptually the procedural steps of the control unit 22 in controlling an automated apparatus in accordance with a method of the present invention. Initially, a structural preform (not shown) is placed within the mold cavity 48 of the mold, and the mold is closed, as illustrated schematically in FIG. 1. The restriction on the mold cavity 48 containing the structural preform is then checked to determine whether the shape and/or volume of the preform is within the specified range for the particular article being molded, as indicated by step 100 in FIG. 2A. This is done by disconnecting the second resin line 42 from the inlet port 44 of the mold, operating the vacuum pump 64 so as to draw air through the mold, and monitoring the pressure reading transmitted by the pressure sensor 66. The reading transmitted by the pressure sensor 66 is indicative of the restriction in air flow through the mold cavity due to the structural preform. If the restriction reading is outside of a predetermined range for the particular type of article being molded, this is an indication that the shape and/or volume of the preform is not correct, and the control unit 22 signals to the operator that the preform should be rejected, as indicated by step 102 in FIG. 2A. If the restriction is within range, however, the control unit 22 permits the resin transfer molding procedure to continue, as indicated in FIG. 2A.

The liquid resin is introduced into the resin pot 12, the heating elements 18 of the resin pot are activated, and the temperature of the resin pot is then measured based on the signals transmitted by the thermocouples 20, as indicated as step 104 in FIG. 2A. If the temperature of the resin pot is not within a predetermined temperature range, then the control unit 22 adjusts the heating elements 18 to increase or decrease the temperature of the resin pot as necessary, as indicated by step 106 in FIG. 2A. The control unit 22 continuously monitors the temperature of the resin pot, and adjusts the heating elements as necessary to maintain the resin within the resin pot at a substantially constant predetermined working temperature throughout the resin transfer process.

The control unit opens the valve 36, closes the valve 54, and actuates the hydraulic cylinder 16 and piston member 14 to pump resin into the first resin line 26, the preheater 28, and the second resin line 42. The control unit 22 also then continuously monitors the temperatures of the first and second heated resin lines 26 and 42, respectively, based on the signals transmitted by the corresponding thermocouples, as indicated by step 108 in FIG. 2A. If the temperature of either resin line is not within a predetermined temperature range, the control unit 22 adjusts the corresponding heating elements as necessary to place the respective resin line within its predetermined temperature range, as indicated by step 110. The control unit 22 also continuously monitors the temperature of the preheater 28 and of the mold 46, and adjusts the corresponding heating elements as necessary in order to maintain the temperature of the resin within the preheater and the mold cavity within a predetermined range, as indicated by steps 112, 114, 116, and 118.

Prior to introduction of the heated resin into the mold cavity 48, the control unit 22 opens the vacuum valve 62, and operates the vacuum pump 64 to create a predetermined negative pressure within the mold cavity 48. During the vacuum pumping procedure, the control unit 22 monitors the vacuum pressure based on the signals transmitted by the pressure sensor 66, in order to determine if the pressure falls below a minimum value, and thus whether a sufficient vacuum is created in the mold cavity 48 for introduction of resin into the mold, as indicated by step 120.

When the vacuum pressure falls below the predetermined minimum value, the control unit 22 opens the mold inlet valve 54, and begins the resin transfer process by actuating the hydraulic cylinder 16 to move the piston 12 and begin to pump the resin into the mold cavity, as indicated by step 124. The control unit 22 also initiates a timer at the start of the resin transfer process, and records the piston travel over time throughout the resin transfer process based on the signals transmitted by the position sensor 24, as indicated by steps 126 and 128. When the liquid resin flows through the mold cavity 48, vacuum port 60, and into the vacuum line, the control unit 22 closes the vacuum valve 62 to cut-off the vacuum pump from the mold.

Throughout the resin transfer process, the control unit 22 monitors the pressure within the first resin line 26 based on the signals transmitted by the pressure sensor 36, and controls the hydraulic pressure of the hydraulic cylinder 16, and thus the pressure applied by the piston 14, to maintain a substantially constant resin pressure, as indicated by steps 132 and 134. The control unit 22 also monitors the rate of piston travel throughout the resin transfer process based on the signals transmitted by the position sensor 24, in order to determine whether the rate falls below a predetermined minimum value, as indicated by step 136. If the rate of piston travel drops below a predetermined minimum value, indicating that the flow rate of resin from the resin line into the mold cavity is at or approaching zero and the structural preform is substantially impregnated with resin, the control unit 22 closes the mold inlet valve 54 and terminates piston operation, as indicated by steps 138 and 140. In the embodiment of the present invention illustrated, if the position sensor 24 indicates zero movement of the piston member during a predetermined time frame, for example, one minute, this indicates that the resin flow rate is substantially zero, and the control unit 22 therefore terminates the resin transfer process.

The control unit then generates a "resin flow" chart, which is a graphical illustration of the piston travel relative to time during the resin transfer process for each article being molded, as indicated by step 142. A typical resin flow chart generated by an apparatus of the present invention is illustrated in FIG. 3. As can be seen, the x-axis of the chart indicates the time in seconds, and the y-axis indicates the piston travel in inches. In FIG. 3, there are six curves plotted, each plot indicating the resin flow for a respective molded article (parts A through F). The control unit 22 also prints at the base of the flow chart the serial number ("S/N") for each of the molded articles or parts plotted, as illustrated in FIG. 3.

As can be seen, the plots for parts A, B, C and D are all substantially the same, thus indicating that each of these parts absorbed substantially the same volume of resin at substantially the same rate. The plots for parts E and F, on the other hand, are substantially different, indicating that part E absorbed more resin than any of parts A through D, and that part F absorbed substantially more resin than any of parts A through D. Since parts A through F are each the same type of part, this indicates that for parts E and F, either the mold leaked during the resin transfer process, or the structural preform of the respective part is cracked or is otherwise defective and absorbed too much resin. Accordingly, parts E and F should be rejected as defective, whereas the remaining parts A through D are acceptable under this initial test for quality control.

Once the resin transfer process is terminated, i.e., the mold inlet valve is closed, %he control unit 22 initiates a timer for the cure cycle of the part being molded, as indicated by step 144 in FIG. 2B. In the embodiment of the present invention illustrated, the mold is maintained at substantially the same temperature as during the resin transfer process, and as initially set and continuously monitored and maintained by the control unit, as indicated by steps 116 and 118 of FIG. 2A. If necessary, the control unit 22 can adjust the temperature of the mold as necessary during the cure cycle of each particular part being molded.

When the predetermined time period set by the timer is terminated, thus indicating that the cure cycle is complete, the control unit 148 turns off the heating elements 56 of the mold, as indicated by steps 148 and 150 of FIG. 2B. Once the molded article becomes sufficiently cool to handle, it can be removed from the mold, as indicated by step 152.

Throughout the cure cycle, the control unit 22 monitors the temperature of the mold, as indicated by the signals transmitted by the thermocouples 58, and generates a "cure cycle" chart, which illustrates in graphical format the temperature of the mold throughout the time period of the cure cycle. A typical cure cycle chart generated by an apparatus of the present invention is illustrated in FIG. 4. As can be seen, the x-axis indicates the time, and the y-axis indicates the temperature of the mold. This chart is particularly useful for quality control purposes in order to ensure that each part undergoes proper thermal curing after termination of the resin transfer process. If, for example, a heating element of the mold fails, and thus the temperature of the mold unexpectedly drops during the curing cycle, the control unit records the failure, and the part can be rejected based on the cure cycle chart. The control unit 22 can print the serial number for each part identified on the respective cure cycle chart, for example, and if necessary, the cure cycle charts can accompany the respective parts throughout the manufacturing processes associated with such parts to document and ensure that the parts meet quality control specifications.

One advantage of the present invention, is that a system is provided for automatically carrying out resin transfer molding processes, without requiring the operator skill and judgment normally associated with prior art methods and apparatus for resin transfer molding. The control unit monitors the pressure within the resin transfer line, and controls the pumping unit to maintain a substantially constant pressure, or to maintain the pressure within the resin transfer line within a predetermined pressure range, throughout the resin transfer process. The control unit also monitors signals indicative of the resin flow rate between the resin pot and the mold cavity, as indicated by the position sensor, and automatically terminates the resin transfer process in response to the resin flow rate falling below a predetermined minimum value. There is no need for an operator to determine, based on experience and skill, when each article of manufacture is impregnated with resin, as was the case with prior apparatus and methods for resin transfer molding. Repeatability and quality control is therefore substantially enhanced with the present invention.

Another advantage of the present invention, is that means are provided for measuring the piston travel, and thus the resin flow rate during the resin transfer process, and means are also provided for recording the piston travel (or resin flow rate) throughout the resin transfer process. This is a significant advantage in ensuring quality control. As described above, if the resin flow rate deviates from the norm, as illustrated by the resin flow chart, the defective part can be singled out and rejected. Similarly, the cure cycle chart generated in accordance with the present invention records any temperature anomalies during thermal curing of the molded articles, and enables an operator to single out and reject any parts subjected to a defective curing cycle.

Yet another advantage of the present invention is that means are provided for continuously monitoring the parameters of a resin transfer molding system, such as the temperatures of the various components, and the pressures within the resin transfer lines and/or within the mold cavity, and each of these monitored parameters are maintained within predetermined ranges. Accordingly, consistency and repeatability is substantially enhanced in a resin transfer molding system of the present invention.

As will be recognized by those skilled in the pertinent art, numerous modifications may be made to the above-described apparatus and method of the present invention, without departing from the scope of the present invention as defined in the following claims.

What is claimed is:

1. An apparatus for resin transfer molding articles, comprising:

a mold defining a mold cavity;

a resin container coupled in fluid communication with the mold cavity for receiving resin for introduction into the mold cavity;

first means for pumping resin from the resin container into the mold cavity;

second means for generating signals indicative of the flow rate of resin flowing between the resin container and the mold cavity;

third means for maintaining the pressure of the resin flowing between the resin container and the mold cavity within a predetermined pressure range; and fourth means responsive to the signals transmitted by the second means for terminating the pumping of resin by the first means in response to the resin flow rate decreasing to a value less than a predetermined minimum value.

2. An apparatus as defined in claim 1, further comprising means for generating data indicative of the flow rate of resin flowing between the resin container and the mold cavity in response to the signals indicative of the flow rate during the resin transfer process.

3. An apparatus as defined in claim 1, wherein the means for pumping includes a piston member received within the resin container for pumping resin through the resin container upon movement of the piston member.

4. An apparatus as defined in claim 3, wherein the second means generates signals indicative of the rate of movement of the piston member.

5. An apparatus as defined in claim 1, further comprising means for measuring at least one parameter of the apparatus, comparing a measured value of the at least one measured parameter to a corresponding predetermined value thereof, and adjusting the measured parameter to maintain a substantially constant value thereof.

6. An apparatus as defined in claim 5, wherein the at least one measured parameter is selected from the group including i) the temperature of resin within the resin container, ii) the temperature of resin flowing between the resin container and the mold cavity, and iii) the temperature of the mold cavity.

7. An apparatus for resin transfer molding articles, comprising:

a mold defining a mold cavity for receiving a structural preform to be impregnated with resin;

a resin unit defining a resin chamber for receiving resin and coupled in fluid communication with the mold cavity for receiving resin for introducing resin into the mold cavity;

a pump unit coupled in fluid communication with the resin unit for pumping resin from the resin chamber into the mold cavity;

a first sensor unit for generating signals indicative of the flow rate of resin between the resin chamber and the mold cavity;

a second sensor unit generating signals indicative of the resin flowing between the resin chamber and the mold cavity; and a control unit coupled to the first sensor unit and to the pump unit, and responsive to the signals transmitted by the first sensor unit to terminate pumping of resin by the pump unit in response to the flow rate of resin decreasing to a value less than a predetermined value.

8. An apparatus as defined in claim 7, wherein the control unit is coupled to the second sensor unit, and is responsive to the signals transmitted by the second sensor unit to control operation of the pump unit and maintain the pressure of resin flowing between the resin chamber and the mold cavity within a predetermined pressure range.

9. An apparatus as defined in claim 7, further comprising a control unit coupled to the first sensor unit and responsive to the signals transmitted by the first sensor unit to generate data indicative of the flow rate of resin flowing between the resin container and the mold cavity during the resin transfer process.

10. An apparatus as defined in claim 7, wherein the pump unit includes a piston member received within the resin chamber for pumping resin upon movement of the piston member through the resin chamber.

11. An apparatus as defined in claim 10, wherein the first sensor unit generates signals indicative of the rate of movement of the piston member.

12. An apparatus as defined in claim 7, further comprising at least one third sensor unit for measuring at least one parameter of the apparatus and generating signals indicative thereof, the third sensor unit being coupled to a control unit responsive to the signals transmitted by the third sensor unit to compare the signals to corresponding predetermined values thereof, and to adjust the measured parameter to maintain a substantially constant value thereof.

13. An apparatus as defined in claim 12, wherein the at least one measured parameter is selected from the group including i) the temperature of resin within the resin chamber, ii) the temperature of resin flowing between the resin chamber and the mold cavity, and iii) the temperature of the mold cavity.

14. An apparatus as defined in claim 1, wherein the third means comprises:

means for measuring the pressure of the resin flowing between the resin container and the mold cavity, comparing the measured value of the pressure of the resin flowing between the resin container and the mold cavity to a corresponding predetermined value thereof, and adjusting the pressure of the resin flowing between the resin container and the mold cavity to maintain a substantially constant value thereof.

* * * * *